United States Patent [19]
Uetani et al.

[11] 3,915,750
[45] Oct. 28, 1975

[54] SEPARATOR FOR A BATTERY

[75] Inventors: Yoshio Uetani; Yasuyoshi Taniguchi, both of Ibaraki; Tadao Ashikaga, Kurashiki; Kazuo Mizutani, Takatsuki, all of Japan

[73] Assignees: Hitachi Maxell, Ltd.; Kuraray Co., Ltd., both of Japan

[22] Filed: Feb. 13, 1973

[21] Appl. No.: 332,156

[30] Foreign Application Priority Data
Feb. 14, 1972 Japan.................................. 47-15883

[52] U.S. Cl. ................. 136/131; 136/145; 136/146
[51] Int. Cl.² ............................................. H01M 2/14
[58] Field of Search ........... 136/146, 145, 148, 131, 136/100 M; 162/146

[56] References Cited
UNITED STATES PATENTS
| | | |
|---|---|---|
| 2,335,757 | 11/1943 | Hall .................................. 136/146 |
| 2,653,985 | 9/1953 | Philipps .......................... 136/148 X |
| 2,887,522 | 4/1959 | MacKenzie ..................... 136/148 X |
| 3,114,670 | 12/1963 | Iwasahi ............................... 162/146 |
| 3,121,658 | 2/1964 | Orsino et al. ........................ 162/146 |
| 3,463,669 | 8/1969 | Jammet............................ 136/146 X |

*Primary Examiner*—Patrick P. Garvin
*Assistant Examiner*—John F. Niebling
*Attorney, Agent, or Firm*—Stewart and Kolasch, Ltd.

[57] ABSTRACT

A separator for a battery such as an alkaline manganese cell or a Leclanche cell, which comprises a nonwoven fabric consisting of 30 to 60 percent by weight of viscose rayon fiber, 10 to 65 percent by weight of hardly water-soluble polyvinyl alcohol fiber and 5 to 30 percent by weight of water-soluble polyvinyl alcohol fiber, said viscose rayon fiber and said hardly water-soluble polyvinyl alcohol fiber being bound with each other by the water-soluble polyvinyl alcohol fiber. The separator has large mechanical strength and high chemical resistance and retains a large amount of the electrolyte therein, and also improves the electrical discharge capacity of the battery.

7 Claims, 4 Drawing Figures

SEPARATOR FOR A BATTERY

The present invention relates to an improvement in a battery such as an alkaline manganese cell or a Leclanche cell, more particularly, to an improvement in a separator used for the battery and a process for manufacturing the same.

As for the separator used for the battery such as an alkaline manganese cell or a Leclanche cell, it is generally required to have high resistivity against the errosive action of the electrolyte consisting of an aqueous solution of potassium hydroxide or an aqueous solution of ammonium chloride and zinc chloride in order to prevent a change in quality and shrinkage, and to have excellent permeability in order to retain a sufficient amount of the electrolyte necessary for the electrical discharge reaction. Furthermore, it is also required to have a certain degree of mechanical strength during manufacturing and even after assembling a battery and a property which facilitates the diffusion of the ions formed by the electrical discharge reaction in order to keep the internal resistance of the battery always small.

Heretofore, natural cellulose fiber such as cotton linter has been generally used as a separator for an alkaline manganese cell by making it into paper in the form of a felt. Although such a separator absorbs a large amount of electrolyte instantly, it is difficult to prevent the separator from a change in quality and deterioration of the mechanical strength after assembling the battery because of its low resistivity against the electrolyte. Such problems become a cause of internal short circuits and the deterioration of the stability of the electrolyte. Furthermore, such separator sometimes produces tears and a change in shape during the assembly of battery because of its mechanical weakness. In the battery using a cup shaped separator made from natural cellulose fiber, there is a disadvantage that the amount of active materials to be filled into the hollow portion of the separator decreases because of the extreme swelling of the separator in the direction of its thickness which is caused by absorption of the alkaline electrolyte.

Attempts have been made to overcome these drawbacks by using a separator which is produced by a method comprising dispersing an alkali resisting synthetic fiber such as polyvinyl fiber or polyvinyl chloride fiber with a binder such as melamine resin or urea resin in water, making the dispersion into a paper or felt, and then heating the paper in order to bind the fibers irregularly and without direction, or a method comprising heaping up irregularly and without direction alkali resisting synthetic fiber, coating a surface of the fiber with a binder such as polyvinyl alcohol by spraying, and then fixing the fiber by heat treatment. However, such separators have a lower hydrophilic property because the fiber which constitutes the separator is more hydrophobic than cotton linter and the binder which binds the fiber is also hydrophobic or becomes hydrophobic by means of heat treatment. Accordingly, it takes a long time to complete the saturation of the separator with the electrolyte, thereby resulting in the deterioration of the efficiency of manufacturing a battery. Furthermore, the battery which includes the above separator tends to deteriorate in its discharge capacity because of an increase in the internal resistance thereof. Said increase of the internal resistance of the battery is caused by the decrease of the amount of the electrolyte absorbed in the separator.

On the other hand, natural cellulose fiber such as kraft pulp is generally used as a separator for a Leclanche cell by making it into paper and then forming a paste material layer thereon by coating, followed by drying, the paste materials. In the cell which contains the above separator, the separator is changed in quality by concentrated zinc chloride produced by the electrical discharge reaction around the surface of the zinc electrode. Such a problem causes the deterioration of the separating function and retaining function of the separator, resulting in the deterioration of the cell capacity. Furthermore, the separator which is coated with an aqueous solution of the paste material tends to form many wrinkles on its surface during its drying process. This phenomenon becomes a cause of an inequality of the electrical discharge reaction. Attempts have been made to overcome these drawbacks and disadvantages by using synthetic fiber having large mechanical strength and high resistivity against the electrolyte. As such synthetic fiber, there may be used polyamide fiber. However, these separators have low permeability and low retention force and tend to produce unevenness on their surfaces during the drying of the paste material.

It is an object of the present invention to provide a separator for a battery which comprises non-woven fabric consisting of 30 to 60 percent by weight of viscose rayon fiber, 10 to 65 percent by weight of hardly water-soluble polyvinyl alcohol fiber and 5 to 30 percent by weight of water-soluble polyvinyl alcohol fiber, said viscose rayon fiber and said hardly water-soluble polyvinyl alcohol fiber being bound with each other by said water-soluble polyvinyl alcohol fiber.

Another object of the present invention is to provide a separator for a battery which comprises non-woven fabric consisting of 30 to 60 percent by weight of viscose rayon fiber, 10 to 65 percent by weight of hardly water-soluble polyvinyl alcohol fiber and 5 to 30 percent by weight of water-soluble polyvinyl alcohol fiber, said viscose rayon fiber and said hardly watersoluble polyvinyl alcohol fiber being bound with each other by said water-soluble polyvinyl alcohol fiber, and said separator being treated with surfactant.

A further object of the present invention is to provide a process for manufacturing a separator which can be used for a battery.

Other objects, features and advantages of the present invention will become apparent during the process of the following description and the accompanying drawing which shows a construction of the separator and a battery according to the present invention.

Figure 1:
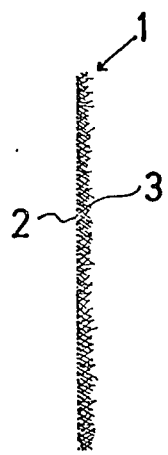
FIG. 1 is a longitudinal sectional view of a separator according to the present invention.

In accordance with the present invention the purpose of decreasing the discussed disadvantages can be achieved by using a separator made from non-woven fabric consisting of 30 to 60 percent by weight of viscose rayon fiber, 10 to 65 percent by weight of hardly water-soluble polyvinyl alcohol fiber and 5 to 30 percent by weight of water-soluble polyvinyl alcohol fiber, said viscose rayon fiber and said hardly water-soluble polyvinyl alcohol fiber being bound with each other by said water-soluble polyvinyl alcohol fiber.

Viscose rayon fiber used as a material for the separator of the present invention functions to absorb and retain a sufficient amount of the electrolyte necessary for the electrical discharge reaction and helps to keep the internal resistance of the battery always small because of its fine close adhesion with the electrolyte. Viscose rayon fiber for the separator may be used in an amount of 30 to 60 percent by weight, preferably, 40 to 50 percent by weight. As to the viscose rayon, there may be used, for example, the generally used viscose rayon fiber; polynosic; mixed spinning rayon consisting of a mixture of viscose rayon and high molecular weight material such as casein or a mixture of viscose rayon and synthetic high molecular weight material such as polyvinyl alcohol; viscose rayon graft polymerized by a vinyl monomer such as acrylonitrile, styrene, etc.; viscose rayon cross-linked by a polymer having a cross-linking reaction radical such as polymethyl acrylate or a methylol compound of polyacrylic amide or polymethacrylic amide. Among these viscose rayon fibers, polynosic is particularly preferred. Polynosic may be produced by spinning viscose rayon having a low degree of aging in a spinning bath which contains a small amount of salts and acids. The obtained polynosic has a mean polymerization degree of 450 to 750 which is higher than that of the generally used viscose rayon fiber, i.e., 250 to 320. Furthermore, it has high mechanical strength and high chemical resistance and is stable in shape.

The hardly water-soluble polyvinyl alcohol fiber functions to increase the mechanical strength of the separator and intertwines with the viscose rayon fiber. As a result, it helps to increase the manufacturing efficiency and prevents the separator from extreme swelling and shrinkage. For these purposes, the hardly water-soluble polyvinyl alcohol fiber may be used in an amount of 10 to 65 percent by weight, preferably, 30 to 50 percent by weight. As to hardly water-soluble polyvinyl alcohol fibers which dissolve scarcely in hot water, there may be used, for example, partially saponified polyvinyl alcohol, completely saponified polyvinyl alcohol or a mixture thereof, said materials being elevated in crystallinity and the degree of orientation by ductiling, while effecting a heat treatment by conventional means after spinning, or said materials being acetalized, in addition to ductiling, while effecting a heat treatment after spinning.

Water-soluble polyvinyl alcohol fiber helps to increase the wet tenacity of the separator by firmly binding the viscose rayon fiber with the hardly water-soluble polyvinyl alcohol fiber. Further, as it has low crystallinity, it swells in water without disintegration of the fiber and dissolves in hot water at a temperature of more than 50°C. As the water-soluble polyvinyl alcohol fiber, there may be used polyvinyl alcohol as it is or slightly ductiled while treated with heat. Water-soluble polyvinyl alcohol fiber may be used in an amount of 5 to 30 percent by weight, preferably, 10 to 20 percent by weight.

Viscose rayon and polyvinyl alcohol which are used as materials for the separator of the present invention are hydrophilic and have a fine absorbency of the electrolyte. When treating these materials with surfactant, they are further improved in permeability, resulting in an improvement in the manufacturing efficiency of the battery. As to the surfactant, a nonionic surfactant comprising a condensation product made from an alkylene oxide and a monomer selected from the group consisting of a higher alcohol, alkyl phenol, higher alkyl mercaptan, higher alkyl amine, higher fatty acid and higher fatty acid amide, is particularly preferred. Nonionic surfactants have chemical resistance and fine absorbency. Although it is possible to treat the separator with a surfactant before and after the drying process, it is preferred to conduct such a treatment before drying the separator. Because, when such treatment is made after drying the separator, the physical properties thereof such as density, thickness and mechanical strength are changed. As a result, it is difficult to control the quality of the separator. Furthermore, the separator which is treated with surfactant after drying tends to have many wrinkles on the surface thereof. This phenomenon become a cause of inequality of the electrical discharge reaction. However, it should be noted that if such treatment is made before drying the separator, these problems can be overcome.

The separator according to the present invention that contains thermoplastic polyvinyl alcohol fiber in an amount more than 15 percent by weight may be formed in such a way that one surface thereof is smooth and the other is coarse and attains a napped surface upon drying.

Figure 2:
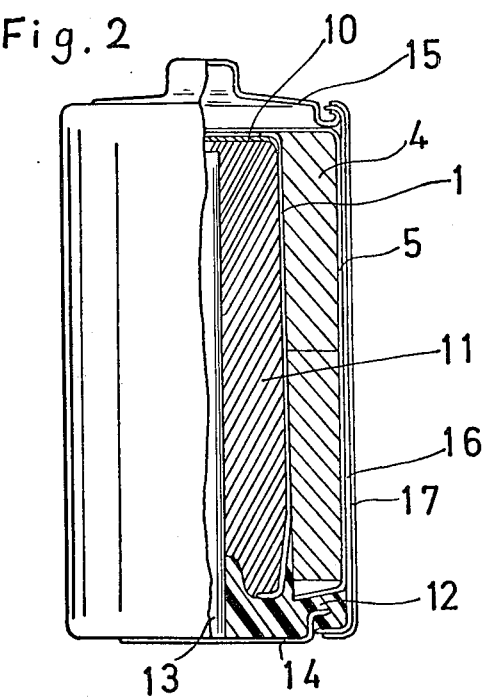
FIG. 2 is a half sectional view of a battery containing the separator of the present invention.

When the separator having a smooth surface and coarse surface is adopted to an alkaline manganese cell as shown in FIG. 2, it is preferred that the smooth surface thereof face the depolarizer and that the coarse surface thereof face the paste material. In this case, it may be possible to adhere the separator with the depolarizer in a fine state and to keep the passage of the electrolyte into the separator smooth by means of the capillary phenomenon on the coarse surface.

When the separator having a smooth surface and a coarse surface is adopted to a Leclanche cell, it is preferred that the smooth surface be coated with a paste material such as corn starch, esterified cross-linked starch, methyl cellulose, etc., and be in contact with the interior side of a zinc can. In the latter case, it is possible to prevent the paste material from migrating into the separator because the surface of the separator to be coated with the paste material is very fine. As a result, a layer of the paste material having uniform thickness and excellent adhesion may be obtained. However, it should be noted that if the coarse surface of the separator is coated with the paste material and such separator is used for the Leclanche cell, the paste material migrates into the depolarizer through the separator, thereby resulting in a decrease of its thickness. As a result, the napped fiber gradually exposes from the layer of the paste material and comes into direct contact with the zinc can, which produces pinholes on the zinc can because of its partial corrosion.

The amount of the paste material coated on the separator produces a large influence of the efficiency of the battery of the present invention. The paste material coated on the separator of the present invention may be used in an amount of about 10 to 70 g./m². The use of the paste material in amounts below and above said amounts do not give advantageous results. When the amount of the paste material is less than about 10 g./m², the paste can not adequately function to retain and fix the electrolyte. As a result, the electrolyte is absorbed into the depolarizer through the separator, which produces a deficiency in the amount of electrolyte necessary for the electrical discharge reaction. On the other hand, the use of the paste material in an amount more than about 70 g./m² produces high resistance against the ion diffusion. These problems become a cause of deteriorating the electrical discharge capacity of the battery. On the contrary, when the paste material is used in an amount of about 10 to 70 g./m², it is possible to retain the electrolyte in a sufficient amount necessary for the electrical discharge reaction between the zinc can and the depolarizer, and to prevent obstruction in the diffusion of the ion formed by electrical discharge reaction. Therefore, a battery possessing superior electrical discharge capacity can be obtained.

The separator according to the present invention is hydrophilic and has a large wet tenacity. Therefore, it is possible to prevent the separator from tearing and from having an unevenness of the surface thereof, Accordingly, it is possible to produce the separator easily.

The following examples serve as an explanation of the details of the specific embodiments of the present invention, but are not intended to be limitative thereof.

EXAMPLE 1

42.5 parts by weight of viscose rayon fiber having a fiber size of 1.5 denier and a staple length of 10 mm, 42.5 parts weight of hardly water-soluble polyvinyl alcohol fiber having a fiber size of 1 denier and a staple length of 3 mm, and 15 parts by weight of water-soluble polyvinyl alcohol fiber consisting of polyvinyl alcohol fiber having a fiber size of 1 denier and a staple length of 3 mm which dissolves in water at a temperature of 70°C were weighed and were dispersed into water. The dispersion was made into paper by a paper machine. Thus obtained wet paper was passed at a rate of 40 meters a minute along a curved surface of a roll which has a large diameter and is heated to a temperature of about 100° to 120°C in order to dry the paper. The dried paper has a smooth surface and a napped coarse surface and is used as a separator as shown in FIG. 2.

In this example, the viscose rayon fiber and hardly watersoluble polyvinyl alcohol fiber were obtained in the following manner. The viscose rayon fiber was produced by spinning of viscose consisting of linter or dissolved pulp, and the hardly water-soluble polyvinyl alcohol fiber was produced by acetalizing polyvinyl alcohol fiber made from polyvinyl alcohol having a mean polymerization degree of 1700 and a degree of saponification of 99.0 percent, ater treating said polyvinyl alcohol fiber with heat in air at a temperature of about 200° to 240°C for a few minutes.

EXAMPLE 2

40 parts by weight of viscose rayon fiber consisting of polynosic fiber having a fiber size of 2.0 denier and a staple length of 51 mm, 50 parts by weight of hardly water-soluble polyvinyl alcohol fiber having a fiber size of 1.5 denier and a staple length of 38 mm, and 10 parts by weight of water-soluble polyvinyl alcohol fiber having a fiber size of 1.5 denier and a staple length of 38 mm which dissolves in water at a temperature of 80°C were mingled by a hopper mixer and then were made into a web having constant thickness by twining the fibers with each other by means of a carding machine. The obtained web was sprayed with steam which was heated to a temperature of about 80° to 120°C and then was dried by passing through heat rolls. Thus a separator both sides of which were smooth was obtained.

The separators having a size of 120 mm × 74 mm and thickness of 0.35 mm and containing viscose rayon fiber in an amount as shown in Table 1 were tested with respect to their swelling percentage facing the direction of their thickness, their shrinking percentage facing the direction of their length, the rate of decrease of their weight and the amount of the electrolyte absorbed therein at the time of their manufacture and then after having been immersed in an aqueous solution of potassium hydroxide (42 percent by weight) for 24 hours at 45°C. The results obtained are shown in Table 1.

Table 1

| Content of viscose rayon fiber (weight percent) | Swelling percentage (volume %) | Shrinking percentage (volume %) | Rate of decrease of weight(%) | Amount of electrolyte(g) |
| --- | --- | --- | --- | --- |
| 10 | 110 | 0.1 | 0.01 | 7.7 |
| 30 | 120 | 0.3 | 0.1 | 8.7 |
| 45 | 140 | 1.0 | 2.1 | 9.4 |
| 60 | 170 | 2.7 | 3.9 | 9.6 |
| 70 | 230 | 7.6 | 6.1 | 10.3 |
| 90 | 340 | 10.5 | 8.4 | 12.4 |

Table 1 shows that it is preferred to use viscose rayon fiber in an amount of about 30 to 60 percent by weight. Because, if the content of viscose rayon fiber is more than 60 percent by weight, it becomes a cause of increasing the swelling percentage, the shrinking percentage and the rate of decrease of weight. On the other hand, if the content of viscose rayon fiber is less than 30 percent by weight, it causes the decrease of the amount of the electrolyte absorbed in the separator. As a result, it is impossible to retain a sufficient amount of the electrolyte necessary for the electrical discharge reaction in the separator. Although it is necessary to have a certain degree of swelling in order to adhere the separator with an electrolyte, if the swelling percentage is extremely large, it becomes a cause of decreasing the amount of active material to be filled in the hollow portion of the cup shaped separator used for the battery. Furthermore, it is also required to lessen the shrinking percentage and the rate of decrease of the weight in order to increase the stability of the separator.

Table 2 shows the soaking time and tensile strength of the separators containing water-soluble polyvinyl alcohol fiber in the amounts as shown in Table 2. The soaking time is the time required for the separator to absorb completely 0.05 mm of the electrolyte consisting of 42 percent by weight of an aqueous solution of potassium hydroxide.

Table 2

| Content of soluble polyvinyl alcohol fiber (weight %) | Soaking time (seconds) | Tensile strength under wet state (g./15mm×150mm) |
| --- | --- | --- |
| 3 | 10 | 47 |
| 5 | 29 | 99 |
| 15 | 75 | 250 |
| 30 | 358 | 305 |
| 45 | 1800 | 361 |

It will be understood that it is preferred to use water-soluble polyvinyl alcohol fiber in an amount of about 5 to 30 percent by weight. Because, if the content of water-soluble polyvinyl alcohol fiber is more than 30 percent by weight, it takes a long time to permit the electrolyte to permeate into the separator completely. This phenomenon becomes a cause of deteriorating the manufacturing efficiency of the battery. On the other hand, if the content of water-soluble polyvinyl alcohol fiber is less than 5 percent by weight, the tensile strength of the separator under the wet condition becomes small. Accordingly, there is the danger of tearing of the separator upon assembling the battery.

An alkaline manganese cell which has adopted the separator produced by Example 1 is shown in FIG. 2. The cell was manufactured in the following manner.

60 parts by weight of manganese dioxide having a particle size of 200 mesh and 10 parts by weight of graphite powder having a particle size of 1,500 mesh were mixed uniformly. 45 g of the thus obtained mixture was weighed and was poured into a metal mould and then was moulded into a tube having an outer diameter of 31 mm, an inner diameter of 22 mm and a height of 45 mm. The tube which is used as depolarizer (4) was inserted into a cathode can (5) consisting of an iron can which was plated with nickel.

Figure 3:
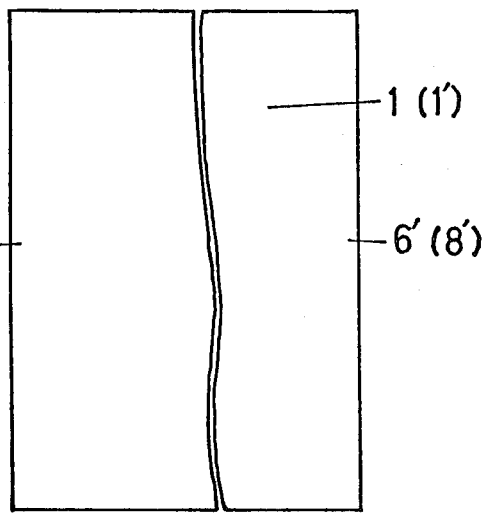
FIG. 3 is an elevational view of the separator of the present invention.
Figure 4:
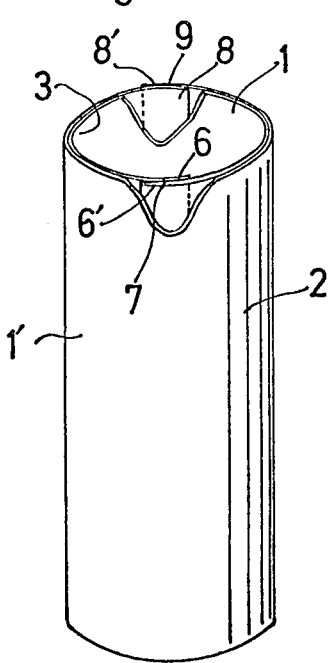
FIG. 4 is a perspective diagram of a cylindrical separator of the present invention.

On the other hand, the separator (1) obtained by Example 1 was cut into a rectangular form having 120 mm in length and 37 mm in breadth as shown in FIG. 3 and then was formed into a cylindrical form as shown in FIG. 4 in such a way that the smooth surface (2) thereof faced the interior side and the opposite coarse surface faced the exterior side. The edge portions (6), (6') of the separator (1) were overlapped together, thereby forming a piled portion (7). Parallel to the separator (1), another separator (1') was formed into a cylinderical form in the same manner. In this case, a smooth surface is facing the interior side and the other coarse surface is facing the exterior side. And the edge portions (8), (8') were overlapped together and formed a piled portion (9). Further, it is preferred to form the piled portion (9) opposite to the piled portion (7). If necessary, it is possible to bind the respective piled portion (7) and (9) with a binder such as carboxymethyl cellulose, polyethylene, etc., if said binder is of ionic permeability.

Thus obtained cylindrical separator (1) was inserted into the hollow portion of said depolarizer (4), and the smooth surface (2) thereof was adhered to the interior side of the depolarizer (4). An insulating plate (10) consisting of paper or synthetic resin was put on the bottom portion of the separator (1). A paste material (11) was then filled into the hollow portion of the separator (1) in an amount of 30 g. Said paste material was obtained by mixing 63 parts by weight of amalgamated zinc powder having a particle size of 35 to 100 mesh, and 37 parts by weight of electrolyte consisting of 42 percent by weight of an aqueous solution of potassium hydroxide gelled by carboxymethyl cellulose. The zinc can so manufactured was then arranged by sealing the open end portion of the zinc can with a gasket (12) made from polyethylene and an anode terminal plate (14) which was fixed with an anode collector (13) to be inserted into the paste material (11). To the top of the cathode can (5), a cathode terminal (15) was placed, the exterior side of said cathode can (5) being covered with an outward cover can (17) and a resin tube (16) consisting of polyvinyl chloride, and said resin tube being placed between cathode can (5) and the outward cover can (17). Thus an alkaline manganese cell A which has adopted the separator of the present invention consisting of 42.5 percent by weight of viscose rayon fiber, 42.5 percent by weight of hardly water-soluble polyvinyl alcohol fiber and 15 percent by weight of water-soluble polyvinyl alcohol fiber was obtained.

An alkaline manganese cell B which has adopted a separator consisting of cotton linter and an alkaline manganese cell C which has adopted a separator consisting of non-woven fabric made from polyamide fiber bound by melamine resin was assembled in the same manner as mentioned above.

The cells A, B and C were tested with respect to their discharge capacity, and the amount of electrolyte absorbed in the separator and the amount of the paste material filled therein. The test on the discharge capacity was carried out by providing a terminal voltage of 0.85 while being continuously discharged at a constant load resistance of 2 ohms at a temperature of 20°C. The cellls A, B and C have a D size, respectively. Each of 50 cells were used for the test. The results obtained are indicated with respective means values in Table 3.

Table 3

| Cell | Amount of absorbed electrolyte (g) | Amount of filled paste material(g) | Discharge capacity (hour) |
|---|---|---|---|
| A | 9.2 | 30 | 12.2 |
| B | 11.3 | 25 | 11.0 |
| C | 8.1 | 33 | 10.7 |

Table 3 shows that the batteries using the separator of the present invention are subtantially improved in their discharge capacity. In the cells B using the separator consisting of cotton linter, the amount of the absorbed electrolyte is large but the amount of the paste material filled therein is small because of extreme swelling of the separator. On the other hand, in the cells C using the separator consisting of non-woven fabric made from polyamide fiber, the amount of the paste material filled therein is large because of less swelling of the separator but the amount of the electrolyte absorbed in the separator is small. These problems become a cause of deteriorating the discharge capacity of the cell. On the contrary, in the cells A using the separator of the present invention, the amount of the electrolyte and the amount of the paste material are equally balanced, which produces superior discharge capacity. Apart from these factors, the present invention has the advantage of improving the manufacturing efficiency of the battery.

The invention being thus described, it will be obvious that the same may be varied in any ways. Such variations are not to be regarded as a departure from the spirit and scope of the invention, and all such modifications as would be obvious to one skilled in the art intended to be included herein.

What is claimed is:

1. A separator for a battery which comprises a non-woven fabric consisting of 40 to 50 percent by weight of viscose rayon fibers, 30 to 50 percent by weight of hardly water-soluble polyvinyl alcohol fibers and 10 to 20 percent by weight of water-soluble polyvinyl alcohol fibers, said viscose rayon fibers and said hardly watersoluble polyvinyl alcohol fibers being bound with each other by said water-soluble polyvinyl alcohol.

2. The separator according to claim 1, wherein the viscose rayon fibers are polynosic.

3. The separator according to claim 1, wherein the separator is treated with a surfactant.

4. The separator according to claim 3, wherein the surfactant is a nonionic surfactant consisting of a condensation product of an alkylene oxide and a monomer selected from the group consisting of higher alcohols, alkyl phenols, higher alkyl mercaptans, higher alkyl amines, higher fatty acids and higher fatty acid amides.

5. An alkali manganese cell which includes the separator according to claim 1, wherein said separator has at least one smooth surface and said smooth surface faces the depolarizer and the opposite coarse surface thereof faces a paste material.

6. A Leclanche which includes the separator according to claim 1, wherein said separator has at least one smooth surface and the smooth surface thereof is coated with a paste material and is in contact with a zinc can.

7. The Leclanche cell according to claim 6, wherein the paste material is used in an amount of about 10 to 70 g./m$^2$.

* * * * *